United States Patent
Majcherczyk et al.

(10) Patent No.: US 12,422,276 B1
(45) Date of Patent: Sep. 23, 2025

(54) SYSTEM TO DETERMINE MAP DATA FOR AUTONOMOUS MOBILE DEVICE MAP

(71) Applicant: AMAZON TECHNOLOGIES, INC., Seattle, WA (US)

(72) Inventors: Nathalie Majcherczyk, San Diego, CA (US); Chang Young Kim, Newark, CA (US); Rajasimman Madhivanan, San Francisco, CA (US); Jong Jin Park, Sunnyvale, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 378 days.

(21) Appl. No.: 18/055,954

(22) Filed: Nov. 16, 2022

(51) Int. Cl.
  *G01C 21/00* (2006.01)
  *G05D 1/00* (2024.01)

(52) U.S. Cl.
  CPC ...... *G01C 21/3867* (2020.08); *G01C 21/3811* (2020.08); *G01C 21/3859* (2020.08); *G05D 1/0274* (2013.01)

(58) Field of Classification Search
  CPC ............ G01C 21/3867; G01C 21/3811; G01C 21/3859; G05D 1/0274
  See application file for complete search history.

(56) References Cited

U.S. PATENT DOCUMENTS

| | | | | |
|---|---|---|---|---|
| 6,363,632 | B1 * | 4/2002 | Stentz | E02F 9/24 701/50 |
| 10,486,485 | B1 * | 11/2019 | Levinson | B60G 17/0162 |
| 2018/0189601 | A1 * | 7/2018 | Dabeer | G06V 20/588 |

FOREIGN PATENT DOCUMENTS

| | | | | |
|---|---|---|---|---|
| CN | 106570454 | A * | 4/2017 | |
| CN | 112622893 | A * | 4/2021 | ............ B60W 30/09 |
| EP | 4398196 | A1 * | 7/2024 | ............ G06T 15/20 |
| GB | 2590115 | A * | 6/2021 | ............ B60W 40/02 |

OTHER PUBLICATIONS

English Translation of CN-106570454-A (Year: 2024).*
English Translation of CN 112622893 A (Year: 2024).*

* cited by examiner

*Primary Examiner* — Scott A Browne
*Assistant Examiner* — Shahira Baajour
(74) *Attorney, Agent, or Firm* — Lindauer Law, PLLC

(57) ABSTRACT

Maps of a physical space provide information to an autonomous mobile device (AMD) about the location of objects. For example, a local map may represent objects currently detected while a global map represents objects that persist over time. Disagreements between the maps may result from quantization errors, sensor errors, changes in the physical space over time that are shown in one map but not another, and so forth. For example, the local map may indicate an obstacle in a space that the global map indicates is empty, or vice versa. A cluster representing an object in a map may be assessed to distinguish if the object is actual or false. Other techniques may be used to determine disagreements. Information about persistent disagreements may be stored for mitigation. The AMD may mitigate disagreements by exploring the physical space associated with the disagreement to add to map data.

20 Claims, 6 Drawing Sheets

SYSTEM TO DETERMINE MAP DATA FOR AUTONOMOUS MOBILE DEVICE MAP

BACKGROUND

An autonomous mobile device (AMD) moves throughout a physical space.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
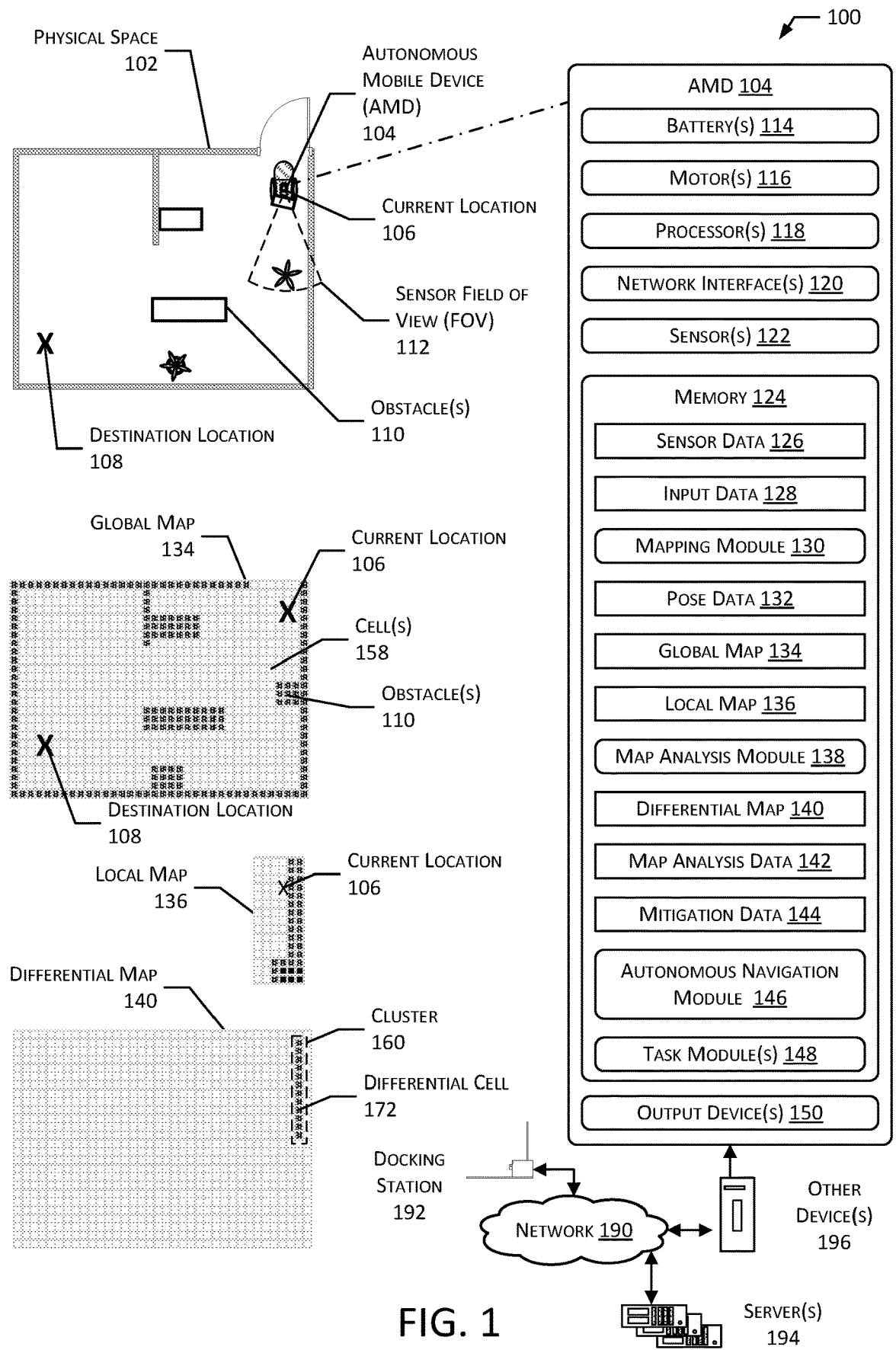
FIG. 1 illustrates a system to determine map data used by an autonomous mobile device (AMD), according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

An autonomous mobile device (AMD) is capable of autonomous movement from one location in a physical space to another location without being controlled by a user. A user may interact with the AMD and the AMD may perform tasks that involve moving in the physical space, displaying information, accepting input, and so forth. To navigate between specified locations in the physical space, the AMD may use global map data that indicates where obstacles are located in the physical space that impede movement.

The global map may be determined based on sensor data that is acquired by the AMD during exploration or subsequent movement through the physical space. The global map may be a composite of other maps acquired over time. The global map may represent obstacles that have been determined to be persistent over time. For example, the global map may represent walls and furniture, but not users in the physical space.

During operation, the AMD operates sensors to acquire sensor data. Sensors have a field of view (FOV), with the sensor data being indicative of information about a portion of the physical space within the FOV. The sensor data may be processed to determine a local map. For example, the local map may be based on recent sensor data acquired for a specified time interval, distance in the physical space, and so forth. The local map may be used for various purposes including collision avoidance. Local map data may be further processed and used to generate or update a portion of the global map that corresponds to the same portion of the physical space. For example, a plurality of local maps acquired during exploration may be "stitched" or combined to create a global map.

Disagreements between maps may occur when two or more maps differ as to whether a particular physical space is occupied by an obstacle or is empty (unoccupied). For example, the global map may indicate that a particular area of the physical space is empty while the local map indicates the area contains an obstacle. Similarly, the opposite situation may occur where the local map indicates no obstacle, but the global map does. Disagreements between maps may result from a variety of circumstances, such as quantization errors, sensor errors, changes in the physical space, and so forth. For example, in some circumstances a sensor may incorrectly report the presence of an obstacle when none exists.

Regardless of their cause, disagreements can adversely affect operation of the AMD. For example, if the AMD incorrectly determines an obstacle is present when there is none, the AMD may be unable to move to a desired destination. In another example, a collision may result if the AMD does not recognize an actual obstacle is present.

Described in this disclosure are systems and techniques for determining and mitigating disagreements between maps used by an AMD. A differential map may be generated that represents a difference between the local map and at least a portion of the global map. The resulting differential map may be assessed to determine if the differential portions are representative of an obstacle, or an anomaly in which no obstacle is present. Anomalies may result from sensor operation, localization failures, and so forth.

In one implementation, the differential map may be processed to determine clusters of differential portions. For example, a cluster may comprise a set of contiguous cells. One or more characteristics of the cluster may be determined. Based on these characteristics, the cluster may be classified. For example, the characteristics may comprise a radius from a geometric center of the cluster to a farthest point on the cluster, and a fill ratio indicating the percentage of cells within a circle with the radius that are designated as differential values other than "empty". If the radius for the cluster is greater than a first threshold, and the fill ratio is greater than a second threshold, the cluster may be deemed to be an anomaly.

The AMD may perform mitigating actions based on the analysis of the differential map. In one implementation, the AMD may move to a viewpoint that can observe at least a portion of the area in the physical space associated with the differential portion. Once at the viewpoint, the AMD may acquire sensor data. The sensor data may be sufficient to resolve the differential, and determine if the area contains an obstacle or does not.

If the analysis of the differential map indicates that the obstacle is likely an actual obstacle, the AMD may avoid traversing that area associated with the differential portion. In one implementation, the AMD may plan a path for movement that avoids the portion of the physical space that contains the likely obstacle. In another implementation, if the obstacle is determined to be a false obstacle, the AMD may plan a path for movement that passes through the portion of the physical space. In some implementations the AMD may move at a slow speed along the portion of the planned path that passes the portion of the physical space associated with the false obstacle.

In some implementations an anomaly map may be determined. The anomaly map may be indicative of the portions of the physical space that are associated with previously determined differential portions that are empty. Some portions of the physical space may cause persistent and ongoing issues with operation of one or more sensors. For example, a mirror presents a reflected image to the AMD, a rough black fabric absorbs infrared light emitted by a time of flight device, a particular narrow and featureless hallway provides difficulties with optical localization, and so forth.

The anomaly map may designate areas of the physical space that are associated with anomalies that may appear to be obstacles, but have been previously determined to not contain obstacles. The anomaly map may be used during navigation planning. For example, a path planning algorithm may use the global map, the local map, and the anomaly map to determine a path through portions of the physical space that are deemed to be empty by the global map and are likely empty anomalies as indicated by the anomaly map.

By using the techniques described herein, the AMD is able to determine and maintain map data that facilitates autonomous navigation. The AMD is thus able to navigate through the physical space more quickly and reliably. Situations in which an anomaly may result in path planning degradation or failure are substantially reduced. As a result, overall operation of the AMD is improved. The use of the system and techniques described in this disclosure also reduce the power consumption associated with the AMD. For example, by permitting movement through areas designated as false obstacles, the AMD may be able to reduce travel distance, thus reducing power consumption by the motors moving the AMD.

ILLUSTRATIVE SYSTEM

FIG. 1 illustrates a system 100 comprising a physical space 102 within which an autonomous mobile device (AMD) 104 is operating, according to some implementations. The physical space 102 may be one or more floors within a residence, office, vessel, and so forth. The AMD 104 is shown at a current location 106 within the physical space 102. Also shown is a destination location 108 that the AMD 104 is autonomously moving towards.

The physical space 102 may include various obstacles 110 such as walls, furniture, houseplants, toys, ledges, or stairs that the AMD 104 is unable to traverse, and so forth. For example, stairs may be an obstacle to a relatively small AMD with wheels for locomotion. In comparison, stairs may not be an obstacle to an AMD with legs for locomotion.

The AMD 104 may include battery(s) 114 to provide electrical power for operation of the AMD 104. The battery 114 may be rechargeable, allowing it to store electrical energy obtained from an external source, such as the docking station 192. In other implementations, a wireless power receiver may be used to provide power for operation of the AMD 104, recharge the battery 114, and so forth.

One or more motors 116 or other actuators enable the AMD 104 to move from one location in the physical space 102 to another. For example, a motor 116 may be used to drive a wheel attached to a chassis of the AMD 104, which causes the AMD 104 to move. The AMD 104 may turn, move forward, move backward, and so forth. In another example, actuators may move mechanical legs allowing the AMD 104 to walk.

The AMD 104 may include one or more hardware processors 118 (processors) configured to execute one or more stored instructions. The processors 118 may comprise one or more cores. The processors 118 may include microcontrollers, systems on a chip, field programmable gate arrays, digital signal processors, graphic processing units, general processing units, and so forth.

The AMD 104 may include one or more network interface(s) 120. The network interface(s) 120 provides communication to an external device, such as a server 194. The network interfaces 120 are discussed in more detail with regard to FIG. 3.

The AMD 104 includes one or more sensors 122 to acquire sensor data 126. For example, the sensors 122 may include microphones, time-of-flight (TOF) sensors, cameras, LIDAR, and so forth. The sensors 122 may generate sensor data 126. The sensors 122 have a sensor field of view (FOV) 112, with the sensor data 126 being indicative of information about a portion of the physical space 102 within the sensor FOV 112. At any given time, the sensor FOV 112 may encompass less than the totality of the physical space 102. For example, the sensor FOV 112 may have a limited angular width and limited sensor effective distance, such as 2 meters. The sensors 122 are discussed in more detail with regard to FIG. 3.

The AMD 104 includes one or more memories 124. The memory 124 may comprise one or more non-transitory computer-readable storage media (CRSM). The memory 124 may store the sensor data 126 resulting from operation of the one or more sensors 122.

The AMD 104 may also receive or determine input data 128. For example, the input data 128 may be determined based on audio input such as speech by the user. In another example, the input data 128 may be received from another device using the network interface 120.

The memory 124 may store one or more modules that may be executed at least in part by one or more of the processors 118.

The AMD 104 may include a mapping module 130. The mapping module 130 determines map data such as a global map 134. The global map 134 is a representation of the physical space 102 that indicates obstacles 110 and their locations in the physical space 102. The global map 134 may be representative of obstacles 110 that have been determined to be persistent over time.

In some implementations the global map 134 may be determined based on a plurality of local maps 136. A local map 136 may be determined based on sensor data 126 acquired during a particular period of time that is relatively short. For example, the local map 136 may represent the physical space 102 based on the sensor data 126 that corresponds to the sensor FOV 112 in the previous 10 seconds. In comparison, the global map 134 may be based on sensor data 126 acquired over a longer period of time, from different viewpoints, and so forth. Local maps 136 acquired over some time may be combined to create the global map 134. For example, many local maps 136 may be "stitched" together to create the global map 134 that represents the entire physical space 102, such as a house or office. Exploration may be deemed to be complete when no unexplored or unobserved areas within the physical space 102 remain. During operation, the AMD 104 may use the global map 134 for functions such as overall path planning from the current location 106 to the destination location 108. While operating, the AMD 104 may continue to acquire sensor data 126 and determine local map(s) 136. The local map 136 may be used for functions such as collision avoidance.

The maps may comprise one or more layers representing different information. For example, a first layer may represent fixed obstacles 110 such as walls and stairs, a second layer may represent dynamic obstacles such as actual obstacles and pets, a third layer may represent moveable obstacles such as doors and some furniture, a fourth layer may represent fixed furniture, and so forth.

The mapping module 130 may include, or operate in conjunction with, a simultaneous localization and mapping (SLAM) module used to determine localization data, such as pose data 132. For example, the sensors 122 may include cameras that acquire images of the physical space 102. These images are processed to determine feature data representative of the presence of features in the images, such as edges of doors, shadows on the wall, texture on the walls, and so forth.

A descriptor is information that describes a particular feature or set of features. Various techniques such as a scale-invariant feature transform (SIFT), speeded up robust features (SURF), a trained convolutional neural network, and so forth may be used to characterize the features and generate the descriptors. For example, the descriptor may comprise data indicative of the feature with respect to 256 different dimensions.

The mapping module 130 may maintain the map data that associates the feature data with respect to one or more of the global map 134 or the local map 136. For example, a pose associated with particular coordinates and orientation with respect to the global map 134 may be associated with feature data indicative of the features visible from that pose.

While the AMD 104 is moving, the mapping module 130 may provide as output a series of poses, each pose describing a location and rotations in the physical space 102. Each pose may be based, at least in part, on the apparent motion of observed features in the images. For example, from image to image at least some of the features that are described by descriptors will be in common. By determining the relative difference in apparent position in the image of the same feature as observed by two different cameras at the same time, the location of the camera with respect to the feature in the physical space 102 may be determined. At successive times, and as the AMD 104 moves and additional images are determined from locations in the physical space 102, the apparent change in position of the same feature across the additional images may be used to determine subsequent poses. In some implementations, an orientation may comprise information about six dimensions (6D), that of three orthogonal axes and corresponding rotations about those axes.

The mapping module 130 may also use data from other sensors 122 such as motor encoders, inertial measurement units (IMU) with one or more accelerometers and gyroscopes, and so forth. For example, the IMU may generate inertial data indicative of rotations or accelerations along particular axes. This inertial data may be integrated to provide information about the movement of the AMD 104.

Localization is the process of determining pose data 132 indicative of a pose of the AMD 104 in the physical space 102 at a particular time. The pose data 132 may indicate localization based on some external reference, such as features visible in the physical space 102. A feature is detectable by a sensor 122. For example, a feature within an image may comprise a shadow, edge of a door frame depicted in the image, and so forth.

A pose is indicative of a location and orientation within the physical space 102. For example, pose data 132 may be specified as coordinates of (+39.2, −10.2, 0, 0°, 0°, 301°). The coordinates may be specified with respect to an origin, such as a docking station 192. The six coordinate values comprise a coordinate value of +39.2 meters (m) along an X-axis, a coordinate value of −10.2 m along a Y-axis, a coordinate value of 0 m along a Z-axis, and a coordinate value indicating rotation with respect to each of the axes, such as an orientation of 301 degrees relative to a specified direction with respect to rotation about a Z-axis. A Z-axis coordinate value may be indicative of a height value or elevation value for the AMD 104. A set of poses generated over time may describe a given AMD 104 trajectory. For example, trajectory data may comprise a time series of pose data 132.

During operation, the AMD 104 may determine the pose data 132 based on the sensor data 126. By knowing where the AMD 104 is, and which direction the sensors 122 of the AMD 104 are pointing, as provided by the pose data 132, the sensor data 126 may be used to determine information about where the obstacles 110 are in the physical space 102. For example, the pose data 132 may be used to provide alignment and position information associated with the local map 136.

In some implementations, the localization may fail. For example, the SLAM system may provide as output pose data 132 that is incorrect with respect to one or more of the location or orientation of the AMD 104. For example, localization may fail if the AMD 104 enters a featureless area, or if some of the features previously used for localization have been obscured or removed. If the localization is incorrect, the AMD 104 may attempt to match the local map 136 with an incorrect portion of the global map 134, resulting in a differential map 140 that exhibits a large number of differential cells 172.

The AMD 104 may attempt to resolve a localization failure by performing various processes. For example, a loop closure process may be performed. The loop closure process may be performed at the current location 106 of the AMD 104. In some situations, the AMD 104 may move to acquire additional sensor data 126 to perform localization. For example, the AMD 104 may move from a featureless hallway into a room in order to observe more features that facilitate localization.

A map analysis module 138 may accept as input the global map 134 and one or more local maps 136 to determine output such as a differential map 140, map analysis data 142, or mitigation data 144. In one implementation, the differential map 140 represents the portion of the physical space 102 that is associated with a disagreement between the global map 134 and the local map 136. In other implementations, the differential map 140 may represent disagreements between two or more layers of the same map.

In one implementation, a disagreement between maps may be deemed to occur if, for a particular portion of the physical space 102 such as represented by a cell 158, a first map indicates presence of an obstacle 110 while the second map indicates no obstacle present or vice versa. For example, the cell 158 may comprise a particular area in the physical space 102 that is 10 centimeters (cm) by 10 cm. In other implementations, disagreements may be based on other variances between the data presented in two or more maps associated with that portion of the physical space 102, classification of an obstacle 110, and so forth.

The differential map 140 may represent these disagreements as differential cells 172. The map analysis module 138 may utilize one or more clustering algorithms to determine a cluster 160 or grouping of differential cells 172 as indicated by the differential map 140. For example, a cluster 160 may be deemed to comprise a contiguous grouping of differential cells 172 that are less than a maximum dimension in size. The cluster 160 may be analyzed to determine map analysis data 142. For example, the size and fill ratio of the cluster 160 may be used to classify whether the cluster 160 is representative of an anomaly such as a false obstacle or an actual obstacle 110 that would impede movement of the AMD 104. Operation of the map analysis module 138 and other modules is discussed in more detail with regard to FIGS. 4-6.

The map analysis module 138 may determine mitigation data 144. For example, the mitigation data 144 may comprise instructions to move the AMD 104 to a viewpoint from which the cluster 160 may be observed from another point of view, allowing additional sensor data 126 to be acquired. This additional sensor data 126 may then be used for comparison to determine if the cluster 160 is representative of an anomaly or an obstacle 110. The mitigation data 144 is discussed in more detail below with regard to FIG. 4.

Other mitigation may include determining an anomaly map that provides information indicative of portions of the physical space 102 that are associated with recurrent anomalies. The anomaly map is discussed in more detail with regard to FIGS. 4-6.

The autonomous navigation module 146 provides the AMD 104 with the ability to navigate within the physical space 102 without real-time actual obstacle interaction. The autonomous navigation module 146 may generate path plan data that is indicative of a path through the physical space 102 from the current location 106 to the destination location 108. The AMD 104 may then begin moving along the path. The autonomous navigation module 146 may use the global map 134, anomaly map, and other information to determine the path plan. While the AMD is moving, the autonomous navigation module 146 may use the local map 136 for collision avoidance. The autonomous navigation module 146 may also accept changes to the path plan, such as specified by the mitigation data 144. For example, if the differential map 140 indicates an anomaly, the mitigation data 144 may specify a waypoint associated with a viewpoint to allow additional sensor data 126 about the anomaly to be acquired. Continuing the example, the autonomous navigation module 146 may allow the AMD 104 to deviate from the originally planned route to "take a look" at the area in the physical space 102 where the maps disagree.

The AMD 104 may utilize one or more task modules 148. The task module 148 comprises instructions that, when executed, provide one or more functions. The task modules 148 may perform functions such as finding a user, following a user, presenting output on output devices 150 of the AMD 104, performing sentry tasks by moving the AMD 104 through the physical space 102 to determine the presence of unauthorized people, and so forth.

Tasks may be indicated by task data, and the task data may be stored in a queue or some other memory structure within the memory 124. In some situations, the task may have been previously scheduled or enqueued before or during exploration. In some implementations, if localization is not necessary to perform a task, the task may be completed. For example, if the task is presenting an audible notification of an incoming message, the AMD 104 may perform the task. If the task requires global map 134 or other information, the AMD 104 may defer performance of the task until the data is available.

The AMD 104 may be configured to dock or connect to a docking station 192. The docking station 192 may provide external power which the AMD 104 may use to charge a battery 114 of the AMD 104. The docking station 192 may provide other functionality, such as restocking consumable supplies.

The AMD 104 may use a network 190 to access one or more servers 194. The servers 194 may process data from the AMD 104. The servers 194 may send data to the AMD 104 that may be subsequently used to operate the AMD 104.

The AMD 104 may also communicate with other devices 196. The other devices 196 may include one or more devices that are within the physical space 102 such as a home or associated with operation of one or more devices in the physical space 102. For example, the other devices 196 may include a doorbell camera, a garage door opener, a refrigerator, washing machine, and so forth. In some implementations the other devices 196 may include other AMDs 104, vehicles, and so forth.

Figure 2:
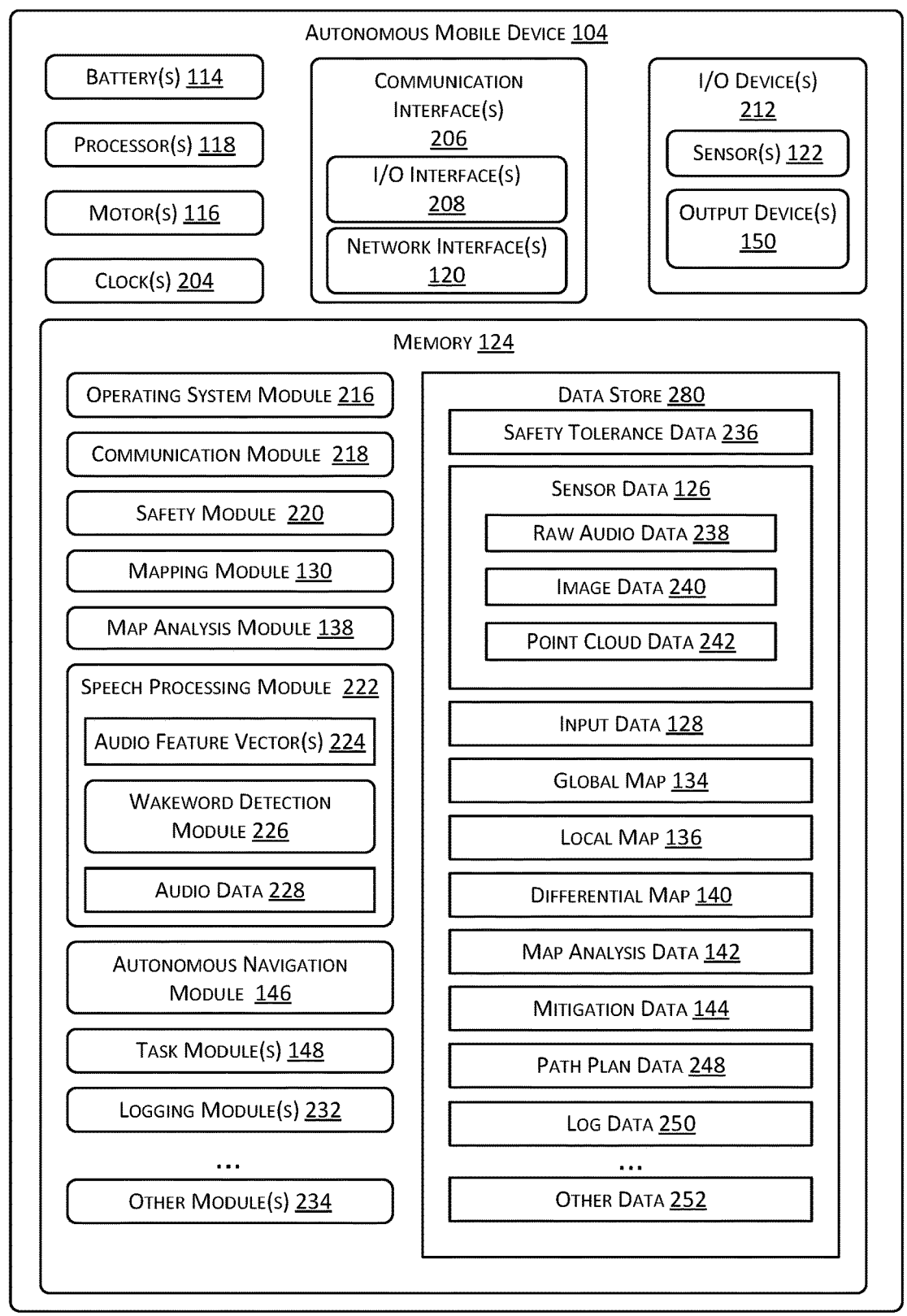
FIG. 2 is a block diagram of the components of the AMD, according to some implementations.

FIG. 2 is a block diagram 200 of the components of the AMD 104, according to some implementations.

As described, the AMD 104 may include one or more hardware processors 118 (processors) configured to execute one or more stored instructions. As described above, the AMD 104 may include one or more motors 116 or other actuators to enable the AMD 104 to move from one location in the physical space 102 to another.

The AMD 104 may include one or more batteries 114 or other power supply to provide electrical power suitable for operating the components in the AMD 104. In some implementations other devices may be used to provide electrical power to the AMD 104. For example, power may be provided by wireless power transfer, capacitors, fuel cells, storage flywheels, and so forth.

One or more clocks 204 may provide information indicative of date, time, ticks, and so forth. For example, the processor 118 may use data from the clock 204 to associate a particular time with an action, sensor data 126, and so forth.

The AMD 104 may include one or more communication interfaces 206 such as input/output (I/O) interfaces 208, network interfaces 120, and so forth. The communication interfaces 206 enable the AMD 104, or components thereof, to communicate with other devices 196 or components. The communication interfaces 206 may include one or more I/O interfaces 208. The I/O interfaces 208 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 208 may couple to one or more I/O devices 212. The I/O devices 212 may include input devices such as one or more of a sensor 122, keyboard, mouse, scanner, and so forth. The I/O devices 212 may also include output devices 150 such as one or more of a motor 116, light, speaker, display, projector, printer, and so forth. The output devices 150 are discussed in more detail with regard to FIG.

3. In some embodiments, the I/O devices 212 may be physically incorporated with the AMD 104 or may be externally placed.

The network interfaces 120 may be configured to provide communications between the AMD 104 and other devices 196 such as other AMDs 104, the docking station 192, routers, access points, and so forth. The network interfaces 120 may include devices configured to couple to personal area networks (PANs), local area networks (LANs), wireless local area networks (WLANS), wide area networks (WANs), and so forth. For example, the network interfaces 120 may include devices compatible with Ethernet, Wi-Fi, Bluetooth, Bluetooth Low Energy, ZigBee, and so forth. The AMD 104 may also include one or more buses or other internal communications hardware or software that allow for the transfer of data between the various modules and components of the AMD 104. The network interfaces 120 are discussed in more detail with regards to FIG. 3.

As shown in FIG. 2, the AMD 104 includes one or more memories 124. The memory 124 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 124 provides storage of computer-readable instructions, data structures, program modules, and other data for the operation of the AMD 104. A few example functional modules are shown stored in the memory 124, although the same functionality may alternatively be implemented in hardware, firmware, or as a system on a chip (SoC).

The memory 124 may include at least one operating system (OS) module 216. The OS module 216 is configured to manage hardware resource devices such as the I/O interfaces 208, the I/O devices 212, the communication interfaces 206, and provide various services to applications or modules executing on the processors 118. The OS module 216 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; the Robot Operating System (ROS), and so forth.

Also stored in the memory 124 may be a data store 280 and one or more of the following modules. These modules may be executed as foreground applications, background tasks, daemons, and so forth. The data store 280 may use a flat file, database, linked list, tree, executable code, script, or other data structure to store information. In some implementations, the data store 280 or a portion of the memory 124 may be distributed across one or more other devices 196 including other AMDs 104, servers 194, network attached storage devices, and so forth.

A communication module 218 may be configured to establish communication with other devices, such as other AMDs 104, an external server 194, a docking station 192, and so forth. The communications may be authenticated, encrypted, and so forth.

Other modules within the memory 124 may include a safety module 220, the mapping module 130, the map analysis module 138, a speech processing module 222, the autonomous navigation module 146, the one or more task modules 148, or other modules 234. The modules may access memory within the data store 280, including safety tolerance data 236, sensor data 126, other data 252, and so forth.

During operation, the mapping module 130 may accept as input the sensor data 126 acquired by one or more sensors 122. The sensor data 126 may include one or more of image data 240, point cloud data 242, or other data. The image data 240 may comprise images acquired by one or more cameras 344. The point cloud data 242 may comprise one or more points with each point indicative of a presence of an obstacle 110 at a particular point in three-dimensional space. For example, the point cloud data 242 may be determined based on output from a lidar 322, stereocamera, depth camera, and so forth.

The safety module 220 may access the safety tolerance data 236 to determine within what tolerances the AMD 104 may operate safely within the physical space 102. For example, the safety module 220 may be configured to stop the AMD 104 from moving when an extensible mast of the AMD 104 is extended. In another example, the safety tolerance data 236 may specify a minimum sound threshold which, when exceeded, stops all movement of the AMD 104. Continuing this example, detection of sound such as an actual obstacle yell would stop the AMD 104. In another example, the safety module 220 may access safety tolerance data 236 that specifies a minimum distance from an object that the AMD 104 is to maintain. Continuing this example, when a sensor 134 detects an object has approached to less than or equal to the minimum distance, all movement of the AMD 104 may be stopped. Movement of the AMD 104 may be stopped by one or more of inhibiting operations of one or more of the motors 116, issuing a command to stop motor operation, disconnecting power from one or more the motors 116, and so forth. The safety module 220 may be implemented as hardware, software, or a combination thereof.

The safety module 220 may control other factors, such as a maximum speed of the AMD 104 based on information obtained by the sensors 122, precision and accuracy of the sensor data 126, and so forth. For example, detection of an object by an optical sensor may include some error, such as when the distance to an object comprises a weighted average between the object and a background. As a result, the maximum speed permitted by the safety module 220 may be based on one or more factors such as the weight of the AMD 104, nature of the floor, distance to the object, and so forth. In the event that the maximum permissible speed differs from the maximum speed permitted by the safety module 220, the lesser speed may be utilized.

The speech processing module 222 may be used to process utterances of the user. Microphones may acquire audio in the presence of the AMD 104 and may send raw audio data 238 to an acoustic front end (AFE). The AFE may transform the raw audio data 238 (for example, a single-channel, 16-bit audio stream sampled at 16 kHz), captured by the microphone, into audio feature vectors 224 that may ultimately be used for processing by various components, such as a wakeword detection module 226, speech recognition engine, or other components. The AFE may reduce noise in the raw audio data 238. The AFE may also perform acoustic echo cancellation (AEC) or other operations to account for output audio data that may be sent to a speaker of the AMD 104 for output. For example, the AMD 104 may be playing music or other audio that is being received from a network 190 in the form of output audio data. To avoid the output audio interfering with the device's ability to detect and process input audio, the AFE or other component may perform echo cancellation to remove the output audio data from the input raw audio data 238, or other operations.

The AFE may divide the raw audio data 238 into frames representing time intervals for which the AFE determines a number of values (i.e., features) representing qualities of the raw audio data 238, along with a set of those values (i.e., a feature vector or audio feature vector 224) representing features/qualities of the raw audio data 238 within each frame. A frame may be a certain period of time, for example a sliding window of 25 ms of audio data 228 taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 238, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 224 (or the raw audio data 238) may be input into a wakeword detection module 226 that is configured to detect keywords spoken in the audio. The wakeword detection module 226 may use various techniques to determine whether audio data 228 includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the AMD 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the AMD 104 (or separately from speech detection), the AMD 104 may use the wakeword detection module 226 to perform wakeword detection to determine when an actual obstacle intends to speak a command to the AMD 104. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 226 may compare audio data 228 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local AMD 104 may "wake" and begin transmitting audio data 228 (which may include one or more of the raw audio data 238 or the audio feature vectors 224) to one or more server(s) 194 for speech processing. The audio data 228 corresponding to audio obtained by the microphone may be processed locally on one or more of the processors 118, sent to a server 194 for routing to a recipient device or may be sent to the server 194 for speech processing for interpretation of the included speech (either for purposes of enabling voice-communications and/or for purposes of executing a command in the speech). The audio data 228 may include data corresponding to the wakeword, or the portion of the audio data 228 corresponding to the wakeword may be removed by the AMD 104 before processing by the speech processing module 222, prior to sending to the server 194, and so forth.

The speech processing module 222 may include or access an automated speech recognition (ASR) module. The ASR module may accept as input raw audio data 238, audio feature vectors 224, or other sensor data 126 and so forth and may produce as output input data 128 comprising a text string or other data representation. The input data 128 comprising the text string or other data representation may be processed by the autonomous navigation module 146 to determine the command to be executed. For example, the utterance of the command "robot, come here" may result in input data 128 comprising the text string "come here". The wakeword "robot" may be omitted from the input data 128.

The map analysis module 138 may determine one or more of the differential map 140, map analysis data 142, mitigation data 144, or other data. The map analysis module 138 is discussed in more detail with regard to FIG. 4.

The autonomous navigation module 146 may use the global map 134 to determine a set of possible paths along which the AMD 104 may move. One of these may be selected and used to determine path plan data 248 indicative of a path. For example, a possible path that is the shortest or has the fewest turns may be selected and used to determine the path. The path is then subsequently used to determine a set of commands that drive the motors 116 connected to the wheels. For example, the autonomous navigation module 146 may determine the current location within the physical space 102 and determine path plan data 248 that describes the path to a destination location 108 such as the docking station 192.

The AMD 104 may include one or more task modules 148 stored in the memory 124. The task modules 148 may provide various functionality, such as a sentry task module to determine if an unauthorized user is present, a videoconferencing task module to allow the user to communicate with another party using the AMD 104, and so forth.

The AMD 104 may include a logging module 232. The logging module 232 may be configured to acquire log data 250. For example, the logging module 232 may operate in conjunction with the other modules, such as the map analysis module 138 and store as the log data 250 information associated with a disagreement between maps. Continuing the example, the log data 250 may comprise data acquired at different times, such as a first local map 136 that is associated with a disagreement and a second local map 136 that provides sensor data 126 that is used to resolve the disagreement.

The AMD 104 may move responsive to a determination made by an onboard processor 118, in response to a command received from one or more communication interfaces 206, as determined from the sensor data 126, and so forth. For example, an external server 194 may send a command that is received using the network interface 120. This command may direct the AMD 104 to proceed to find a particular user, follow a particular user, and so forth. The AMD 104 may then process this command and use the autonomous navigation module 146 to determine the directions and distances associated with carrying out the command. For example, the command to "come here" may result in the task module 148 sending a command to the autonomous navigation module 146 to move the AMD 104 to a particular location near the user and orient the AMD 104 in a particular direction.

The AMD 104 may connect to the network 190 using one or more of the network interfaces 120. In some implementations, one or more of the modules or other functions described here may execute on the processors 118 of the AMD 104, on the server 194, or a combination thereof. For example, one or more servers 194 may provide various functions, such as ASR, natural language understanding (NLU), providing content such as audio or video to the AMD 104, and so forth.

The other modules 234 may provide other functionality, such as object recognition, speech synthesis, user identification, and so forth. The other modules 234 may comprise a speech synthesis module that is able to convert text data to actual speech. For example, the speech synthesis module may be used by the AMD 104 to provide speech that a user is able to understand.

The data store 280 may store the other data 250 as well. For example, localization settings may indicate local preferences such as language, user identifier data may be stored that allows for identification of a particular actual obstacle, and so forth.

Figure 3:
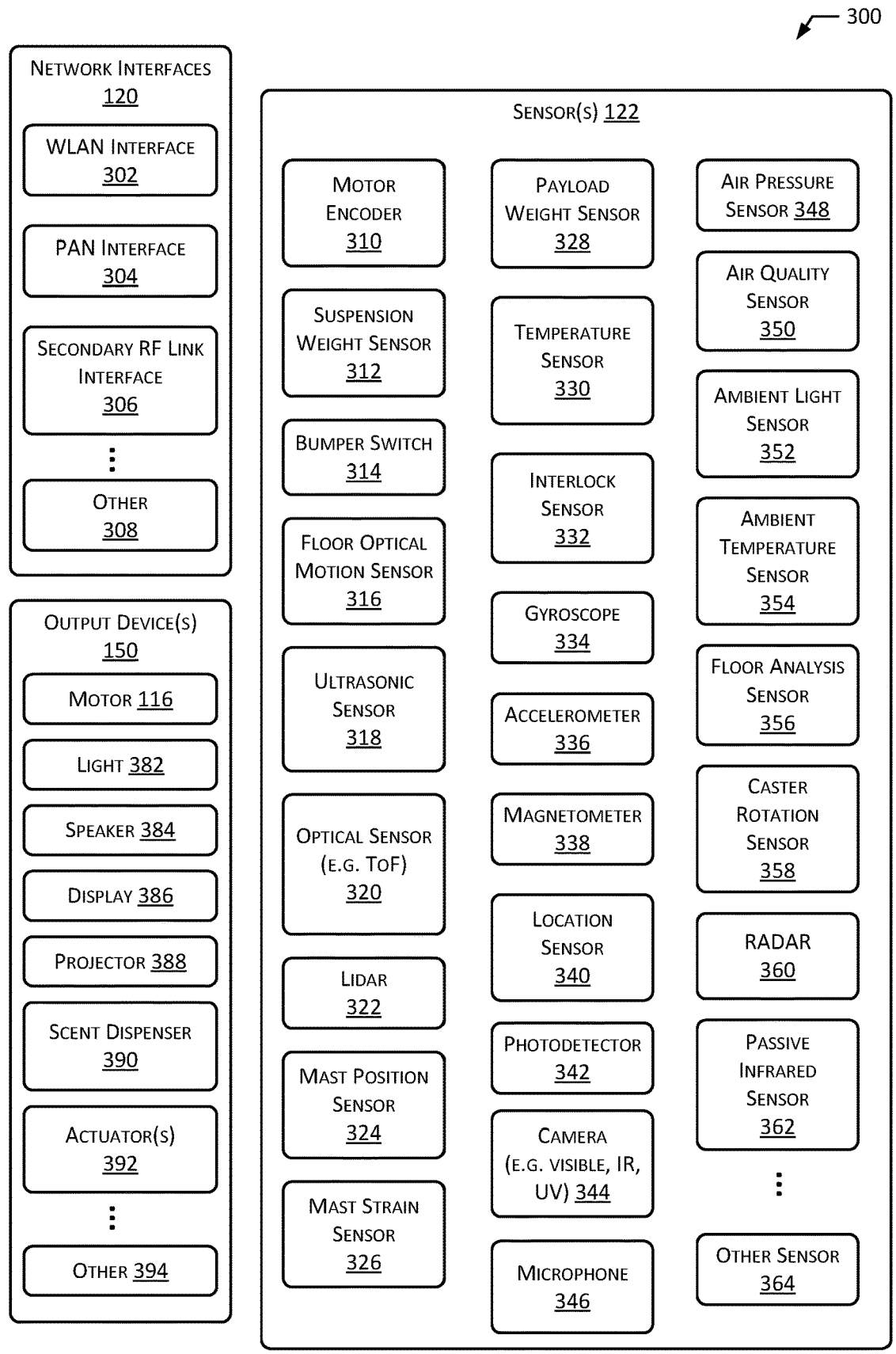
FIG. 3 is a block diagram of some components of the AMD, such as network interfaces, sensors, and output devices, according to some implementations.

FIG. 3 is a block diagram 300 of additional components of the AMD 104, according to some implementations.

The components illustrated here are provided by way of illustration and not necessarily as a limitation. For example, the AMD 104 may utilize a subset of the particular network interfaces 120, output devices 150, or sensors 122 depicted here, or may utilize components not pictured. One or more of the sensors 122, output devices 150, or a combination thereof may be included on a moveable component that may be panned, tilted, rotated, or any combination thereof with respect to a chassis of the AMD 104.

The network interfaces 120 may include one or more of a WLAN interface 302, PAN interface 304, secondary radio frequency (RF) link interface 306, or other interface 308. The WLAN interface 302 may be compliant with at least a portion of the Wi-Fi specification. For example, the WLAN interface 302 may be compliant with at least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The secondary RF link interface 306 may comprise a radio transmitter and receiver that operate at frequencies different from or using modulation different from the other interfaces. For example, the WLAN interface 302 may utilize frequencies in the 2.4 GHz and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHZ ISM band, within a licensed band at another frequency, and so forth. The secondary RF link interface 306 may be utilized to provide backup communication between the AMD 104 and other devices 196 in the event that communication fails using one or more of the WLAN interface 302 or the PAN interface 304. For example, in the event the AMD 104 travels to an area within the physical space 102 that does not have Wi-Fi coverage, the AMD 104 may use the secondary RF link interface 306 to communicate with another device such as a specialized access point, docking station 192, or other AMD 104.

The other 308 network interfaces may include other equipment to send or receive data using other wavelengths or phenomena. For example, the other 308 network interface may include an ultrasonic transceiver used to send data as ultrasonic sounds, a visible light system that communicates by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the 4G, LTE, 5G, or other standards.

The AMD 104 may include one or more of the following sensors 122. The sensors 122 depicted here are provided by way of illustration and not necessarily as a limitation. It is understood that other sensors 122 may be included or utilized by the AMD 104, while some sensors 122 may be omitted in some configurations.

A motor encoder 310 provides information indicative of the rotation or linear extension of a motor 116. The motor 116 may comprise a rotary motor, or a linear actuator. In some implementations, the motor encoder 310 may comprise a separate assembly such as a photodiode and encoder wheel that is affixed to the motor 116. In other implementations, the motor encoder 310 may comprise circuitry configured to drive the motor 116. For example, the autonomous navigation module 146 may utilize the data from the motor encoder 310 to estimate a distance traveled.

A suspension weight sensor 312 provides information indicative of the weight of the AMD 104 on the suspension system for one or more of the wheels or the caster. For example, the suspension weight sensor 312 may comprise a switch, strain gauge, load cell, photodetector 342, or other sensing element that is used to determine whether weight is applied to a particular wheel, or whether weight has been removed from the wheel. In some implementations, the suspension weight sensor 312 may provide binary data such as a "1" value indicating that there is a weight applied to the wheel, while a "0" value indicates that there is no weight applied to the wheel. In other implementations, the suspension weight sensor 312 may provide an indication such as so many kilograms of force or newtons of force. The suspension weight sensor 312 may be affixed to one or more of the wheels or the caster. In some situations, the safety module 220 may use data from the suspension weight sensor 312 to determine whether or not to inhibit operation of one or more of the motors 116. For example, if the suspension weight sensor 312 indicates no weight on the suspension, the implication is that the AMD 104 is no longer resting on its wheels, and thus operation of the motors 116 may be inhibited. In another example, if the suspension weight sensor 312 indicates weight that exceeds a threshold value, the implication is that something heavy is resting on the AMD 104 and thus operation of the motors 116 may be inhibited. For example, the threshold value may comprise a weight of a load that compresses a suspension system to a minimum height, or results in a mass that exceeds a torque output of the motors 116 to maintain a minimum acceleration.

One or more bumper switches 314 provide an indication of physical contact between a bumper or other member that is in mechanical contact with the bumper switch 314. The safety module 220 utilizes sensor data 126 obtained by the bumper switches 314 to modify the operation of the AMD 104. For example, if the bumper switch 314 associated with a front of the AMD 104 is triggered, the safety module 220 may drive the AMD 104 backwards.

A floor optical motion sensor (FOMS) 316 provides information indicative of motion of the AMD 104 relative to the floor or other surface underneath the AMD 104. In one implementation, the FOMS 316 may comprise a light source such as light-emitting diode (LED), an array of photodiodes, and so forth. In some implementations, the FOMS 316 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data. The floor characterization data may be used for navigation.

An ultrasonic sensor 318 utilizes sounds in excess of 20 kHz to determine a distance from the sensor 122 to an object. The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 318 may provide information indicative of a presence of an object, distance to the object, and so forth. Two or more ultrasonic sensors 318 may be utilized in conjunction with one another to determine a location within a two-dimensional plane of the object.

In some implementations, the ultrasonic sensor 318 or a portion thereof may be used to provide other functionality. For example, the emitter of the ultrasonic sensor 318 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 126 indicative of one or more of a presence or absence of an object, a distance to the object, or characteristics of the object. The optical sensor 320 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual sensing element may be associated with a field of view (FOV) that is directed in a different way. For example, the optical sensor 320 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 122 such as an image sensor or camera 344. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, the safety module 220 and the autonomous navigation module 146 may utilize the sensor data 126 indicative of the distance to an object in order to prevent a collision with that object.

Multiple optical sensors 320 may be operated such that their FOV overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

A lidar 322 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 126 may be generated that is indicative of the presence of objects and the relative positions, shapes, and so forth that are visible to the lidar 322. Data from the lidar 322 may be used by various modules. For example, the autonomous navigation module 146 may utilize point cloud data generated by the lidar 322 for localization of the AMD 104 within the physical space 102.

The AMD 104 may include a mast. A mast position sensor 324 provides information indicative of a position of the mast of the AMD 104. For example, the mast position sensor 324 may comprise limit switches associated with the mast extension mechanism that indicate whether the mast is at an extended or retracted position. In other implementations, the mast position sensor 324 may comprise an optical code on at least a portion of the mast that is then interrogated by an optical emitter and a photodetector 342 to determine the distance to which the mast is extended. In another implementation, the mast position sensor 324 may comprise an encoder wheel that is attached to a mast motor that is used to raise or lower the mast. The mast position sensor 324 may provide data to the safety module 220. For example, if the AMD 104 is preparing to move, data from the mast position sensor 324 may be checked to determine if the mast is retracted, and if not, the mast may be retracted before to beginning movement.

A mast strain sensor 326 provides information indicative of a strain on the mast with respect to the remainder of the AMD 104. For example, the mast strain sensor 326 may comprise a strain gauge or load cell that measures a sideload applied to the mast or a weight on the mast or downward pressure on the mast. The safety module 220 may utilize sensor data 126 obtained by the mast strain sensor 326. For example, if the strain applied to the mast exceeds a threshold amount, the safety module 220 may direct an audible and visible alarm to be presented by the AMD 104.

The AMD 104 may include a modular payload bay. A payload weight sensor 328 provides information indicative of the weight associated with the modular payload bay. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 220 may utilize the payload weight sensor 328 to determine if the modular payload bay has been overloaded. If so, an alert or notification may be issued.

One or more device temperature sensors 330 may be utilized by the AMD 104. The device temperature sensors 330 provide temperature data of one or more components within the AMD 104. For example, a device temperature sensor 330 may indicate a temperature of one or more of the batteries 114, one or more motors 116, and so forth. In the event the temperature exceeds a threshold value, the component associated with that device temperature sensor 330 may be shut down. For example, the threshold value may be determined based on component specifications, such as a maximum permissible temperature of the batteries 114.

One or more interlock sensors 332 may provide data to the safety module 220 or other circuitry that prevents the AMD 104 from operating in an unsafe condition. For example, the interlock sensors 332 may comprise switches that indicate whether an access panel is open. The interlock sensors 332 may be configured to inhibit operation of the AMD 104 until the interlock switch indicates a safe condition is present.

A gyroscope 334 may provide information indicative of rotation of an object affixed thereto. For example, a gyroscope 334 may generate sensor data 126 that is indicative of a change in orientation of the AMD 104 or a portion thereof.

An accelerometer 336 provides information indicative of a direction and magnitude of an imposed acceleration. Data such as rate of change, determination of changes in direction, speed, and so forth may be determined using the accelerometer 336. The accelerometer 336 may comprise mechanical, optical, micro-electromechanical, or other devices. For example, the gyroscope 334 in the accelerometer 336 may comprise a prepackaged solid-state inertial measurement unit (IMU) that provides multiple axis gyroscopes 334 and accelerometers 336.

A magnetometer 338 may be used to determine an orientation by measuring ambient magnetic fields, such as the terrestrial magnetic field. For example, the magnetometer 338 may comprise a Hall effect transistor that provides output compass data indicative of a magnetic heading.

The AMD 104 may include one or more location sensors 340. The location sensors 340 may comprise an optical, radio, or other navigational system such as a global positioning system (GPS) receiver. For indoor operation, the location sensors 340 may comprise indoor position systems, such as using Wi-Fi Positioning Systems (WPS). The location sensors 340 may provide information indicative of a relative location, such as "living room" or an absolute location such as particular coordinates indicative of latitude and longitude, or displacement with respect to a predefined origin.

A photodetector 342 provides sensor data 126 indicative of impinging light. For example, the photodetector 342 may provide data indicative of a color, intensity, duration, and so forth.

A camera 344 generates sensor data 126 indicative of one or more images. The camera 344 may be configured to detect light in one or more wavelengths including, but not limited to, terahertz, infrared, visible, ultraviolet, and so forth. For example, an infrared camera 344 may be sensitive to wavelengths between approximately 700 nanometers and 1 millimeter. The camera 344 may comprise charge coupled devices (CCD), complementary metal oxide semiconductor (CMOS) devices, microbolometers, and so forth. The AMD 104 may use image data determined by the camera 344 for object recognition, navigation, collision avoidance, user communication, and so forth. For example, a pair of cameras 344 sensitive to infrared light may be mounted on the front of the AMD 104 to provide binocular stereo vision, with the sensor data 126 comprising images being sent to the autonomous navigation module 146. In another example, the camera 344 may comprise a 10 megapixel or greater camera that is used for videoconferencing or for acquiring pictures for the user.

The camera 344 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 344, particularly those associated with navigation or autonomous operation, may utilize a global shutter. In other implementations, the camera(s) 344 providing images for use by the autonomous navigation module 146 may be determined using a rolling shutter and subsequently may be processed to mitigate image artifacts.

One or more microphones 346 may be configured to determine information indicative of sound present in the physical space 102. In some implementations, arrays of microphones 346 may be used. These arrays may implement beamforming techniques to provide for directionality of gain. The AMD 104 may use the one or more microphones 346 to determine information from acoustic tags, accept voice input from users, determine a direction of an utterance, determine ambient noise levels, for voice communication with another user or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as the photoelectric detector, ionization chamber, and so forth. In another example, the air quality sensor 350 may include a hygrometer that provides information indicative of relative humidity.

An ambient light sensor 352 may comprise one or more photodetectors 342 or other light-sensitive elements that are used to determine one or more of the color, intensity, or duration of ambient lighting around the AMD 104.

An ambient temperature sensor 354 provides information indicative of the temperature of the ambient physical space 102 proximate to the AMD 104. In some implementations, an infrared temperature sensor may be utilized to determine the temperature of another object at a distance.

A floor analysis sensor 356 may include one or more components that are used to generate at least a portion of floor characterization data. In one implementation, the floor analysis sensor 356 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 356 may be used by one or more of the safety module 220, the autonomous navigation module 146, the task module 148, and so forth. For example, if the floor analysis sensor 356 determines that the floor is wet, the safety module 220 may decrease the speed of the AMD 104 and generate a notification alerting the user.

The floor analysis sensor 356 may include other components as well. For example, a coefficient of friction sensor may comprise a probe that comes into contact with the surface and determines the coefficient of friction between the probe and the floor.

A caster rotation sensor 358 provides data indicative of one or more of a direction of orientation, angular velocity, linear speed of the caster, and so forth. For example, the caster rotation sensor 358 may comprise an optical encoder and corresponding target that is able to determine that the caster transitioned from an angle of 0° at a first time to 49° at a second time.

The sensors 122 may include a radar 360. The radar 360 may be used to provide information as to a distance, lateral position, and so forth, to an object.

The sensors 122 may include a passive infrared (PIR) sensor 362. The PIR sensor 362 may be used to detect the presence of users, pets, hotspots, and so forth. For example, the PIR sensor 362 may be configured to detect infrared radiation with wavelengths between 8 and 14 micrometers.

One or more optical sensors 320 may be used as a cliff sensor. The AMD 104 may have one or more cliff sensors located on a front portion of the AMD 104. For example, the cliff sensors may be time-of-flight sensors that have a field of view directed downward toward a floor over which the AMD 104 is moving.

The AMD 104 may include other sensors 364 as well. For example, a capacitive proximity sensor may be used to provide proximity data to adjacent objects. Other sensors 364 may include radio frequency identification (RFID) readers, near field communication (NFC) systems, coded aperture cameras, and so forth. For example, NFC tags may be placed at various points within the physical space 102 to provide landmarks for the autonomous navigation module 146. One or more touch sensors may be utilized to determine contact with a user or other objects.

The AMD 104 may include one or more output devices 150. A motor 116 may be used to provide linear or rotary motion. A light 382 may be used to emit photons. A speaker 384 may be used to emit sound. A display 386 may comprise one or more of a liquid crystal display, light emitting diode display, electrophoretic display, cholesteric liquid crystal display, interferometric display, and so forth. The display 386 may be used to present visible information such as graphics, pictures, text, and so forth. In some implementations, the display 386 may comprise a touchscreen that combines a touch sensor and a display 386.

In some implementations, the AMD 104 may be equipped with a projector 388. The projector 388 may be able to project an image on a surface, such as the floor, wall, ceiling, and so forth.

A scent dispenser 390 may be used to emit one or more smells. For example, the scent dispenser 390 may comprise a plurality of different scented liquids that may be evaporated or vaporized in a controlled fashion to release predetermined amounts of each.

One or more moveable component actuators 392 may comprise an electrically operated mechanism such as one or more of a motor, solenoid, piezoelectric material, electroactive polymer, shape-memory alloy, and so forth. An actuator controller may be used to provide a signal or other input that operates one or more of the moveable component actuators 392 to produce movement of the moveable component.

In other implementations, other 394 output devices may be utilized. For example, the AMD 104 may include a haptic output device that provides output that produces particular touch sensations to the user. Continuing the example, a motor 116 with an eccentric weight may be used to create a buzz or vibration to allow the AMD 104 to simulate the purr of a cat.

Figure 4:
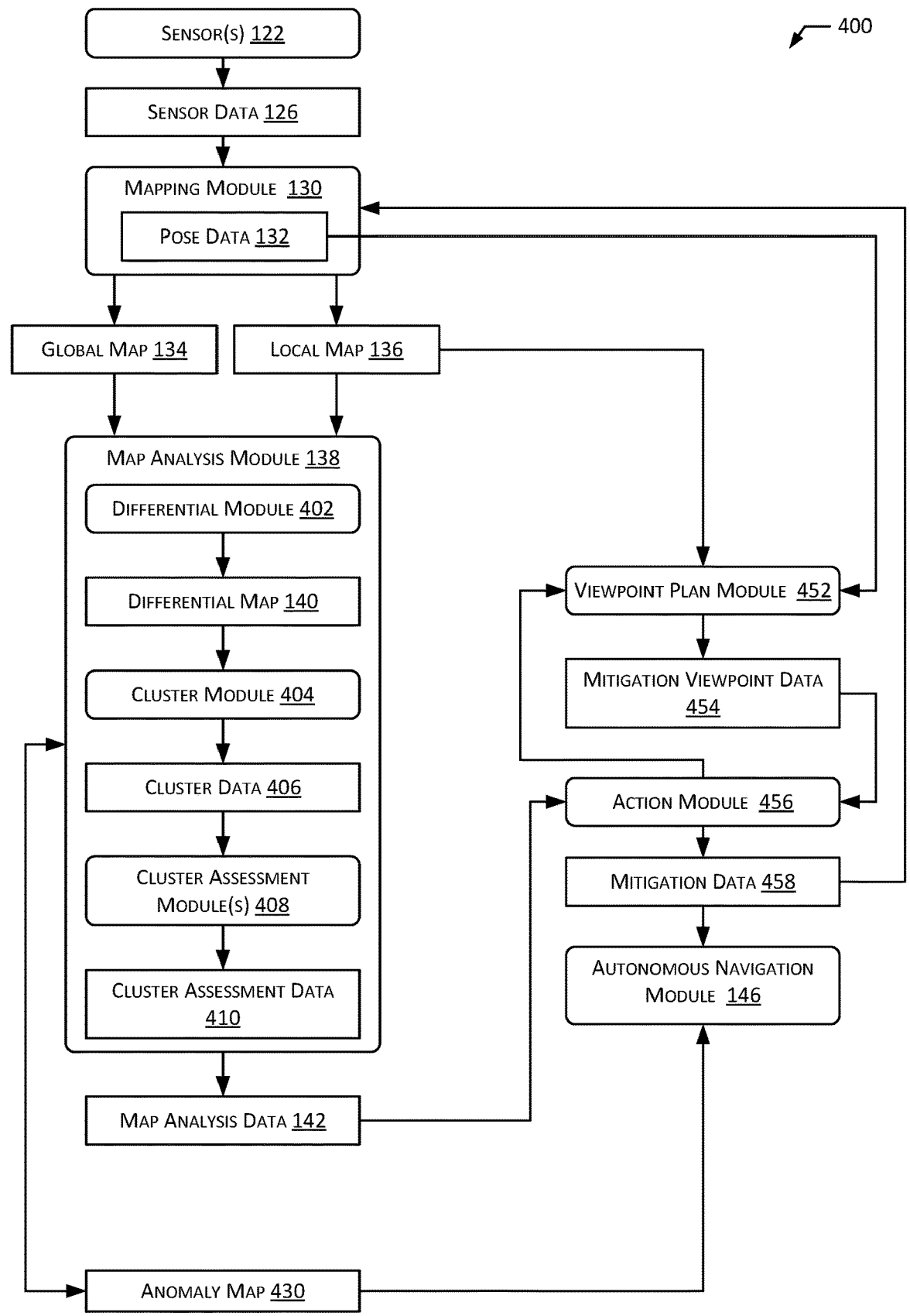
FIG. 4 is a block diagram of several modules that are used to assess map data, according to some implementations.

FIG. 4 is a block diagram 400 of several modules that are used to assess map data, according to some implementations. One or more sensors 122 acquire sensor data 126, providing information about the portion of the physical space 102 that is within the sensor FOV 112.

The mapping module 130 may accept the sensor data 126 as input and determine output such as one or more of pose data 132, the global map 134, the local map 136, and so forth. For example, the pose data 132 may indicate the current location 106 and orientation of the AMD 104 with respect to the physical space 102 at a given time. Continuing the example, a plurality of local maps 136 may be determined based on the sensor data 126. The plurality of these local maps 136, or data based thereon, may be combined to determine the global map 134.

The map analysis module 138 may accept as input one or more maps or layers. In this illustration, the map analysis module 138 accepts as input the global map 134 and the local map 136 and determines the map analysis data 142 as output.

As mentioned earlier, in some implementations two or more maps, or layers of maps, may disagree. This disagreement may manifest as a difference in values for the same portion of the physical space 102, such as represented by a particular cell 158, that exceeds a threshold tolerance. For example, a disagreement may be deemed to have occurred if the global map 134 indicates that cell 158(1934) is filled by an obstacle while the local map 136 indicates that cell 158(1934) is free of an obstacle, or vice versa. In some implementations, a confidence value, cost value, or other metric may be used to specify information associated with a particular cell 158. In such implementations, a threshold comparison may be made. For example, the global map 134 has an obstacle value for cell 158(9931) of "0.1" and the local map 136 indicates the same cell 158(9931) has an obstacle value of "0.9". If a difference between the two values associated with the same cell 158 exceeds a threshold value, a disagreement between the maps may be deemed to have occurred. For example, the difference between the two is 0.8, and given a threshold value of 0.6, a disagreement has occurred in this example.

The map analysis module 138 may comprise a differential module 402. The differential module 402 may accept as input a plurality of maps and provide as output a differential map 140 indicative of differences between the inputs. In one implementation, the differential module 402 may accept as input the global map 134 and the local map 136. For example, the local map 136 may be recently generated as the AMD 104 moves through the physical space 102 while the global map 134 comprises previously stored data.

In one implementation, the differential module 402 may determine a difference based on a comparison using one or more operations, such as subtraction. For example, the input maps may represent data for each cell 158 as a single bit value, 0 or 1. The input maps may then be depicted as binary maps or binary images, with each cell 158 being either 0 (represented as white) indicating no obstacle is present, or 1 (represented as black) indicating presence of an obstacle 110. In this implementation, for each cell 158, the differential module 402 may subtract a first value of the cell 158 in the first map from the second value of the same cell 158 in the second map. If the resulting difference is nonzero, a disagreement may be deemed to have occurred. In other implementations, other operations may be performed. For example, a difference may be compared to a threshold.

As described with regard to FIG. 1, the differential map 140 is representative of the physical space 102, with differential cells 172 representing those cells 158 for which a disagreement has been determined.

A cluster module 404 accepts at least a portion of the differential map 140 as input and determines cluster data 406 indicative of clusters 160 of cells or cubes that are deemed to be associated with or contain a single object. In implementations using area, such as a 2D map, the cells represent an area indicated by the map that corresponds to an area in the physical space 102. In implementations using volume, such as a 3D map, the cubes represent a volume indicated by the map that corresponds to a volume in the physical space 102. While cells and cubes are described, it is understood that other space filling polygons or volume filling solids may be used. For example, instead of square cells the physical space 102 may be represented as tessellated triangles, while rectangular cuboids may be used instead of cubes, and so forth.

In some implementations, a cluster 160 may comprise a plurality of occupied cells 158 that are one or more of: adjacent to, or within a threshold distance of, one another. For example, the cluster module 404 may determine a cluster 160 as all cells or cubes that are immediately adjacent to one another. In another example, a cluster 160 may comprise a plurality of cells that are contiguous with one another. In yet another example, the cluster module 404 may determine a cluster 160 as all cells or cubes that are proximate to one another and are less than a threshold distance, such as two cells. In some implementations, the cluster module 404 may omit information about particular objects in the physical space 102, such as the floor. The cluster module 404 may also limit a cluster 160 to a maximum size, maximum area, span, width, distance between most separated points, and so forth. For example, the cluster module 404 may deem adjacent occupied cells as part of the same cluster 160, up to a maximum cluster having a distance from left to right (relative to the AMD 104) of 2 meters.

In some implementations one or more portions of the cluster 160 may be inferred. For example, the back or side of the object that is opposite to the AMD 104 and its sensors 122 may be unseen. The cluster module 404 may use one or more techniques to determine a boundary of the unseen portion of the cluster 160. For example, the cluster module 404 may assume a straight line in a 2D representation or a flat plane in a 3D representation that connects the visible or "seen" portions of the object.

The cluster data 406 comprises information that is indicative of the cluster 160. The cluster data 406 may be indicative of one or more of a size, shape, boundary, dimensions, orientation, coordinates in the physical space 102 with respect to a reference datum, fill ratio, and so forth. For example, the cluster data 406 may represent the cluster 160 comprising a plurality of cells or cubes, location within the physical space 102, and so forth.

The cluster assessment module 408 accepts the cluster data 406 as input and determines cluster assessment data 410. Cluster assessment data 410 may be determined for individual ones of the clusters 160 represented in the cluster data 406.

In some implementations, the cluster assessment data 410 may be indicative of a class of the object associated with the cluster 160. For example, the cluster assessment data 410 may indicate that a particular cluster 160 is associated with a class such as "actual obstacle", "false obstacle", "unknown", and so forth. Additional classes or subclasses may also be used. For example, "false obstacles" may be further classified as "sensor anomaly", "localization failure", and so forth.

The cluster assessment data 410 may include, or be associated with, the cluster data 406. For example, the cluster assessment data 410 may indicate cluster 160(1) has been determined to have object classification of {false obstacle} while cluster 160(2) has been determined to have object classification of {actual obstacle}. Continuing the example, the cluster assessment data 410 may indicate the {false obstacle} to be classified as one or more of {sensor anomaly} or {localization failure}.

The cluster assessment module 408 may utilize one or more modules or techniques to classify the cluster 160 based on the cluster data 406. In some implementations the classification of the cluster 160 in the differential map 140 may utilize one or more characteristics of the cluster 160 as indicated in or based on the cluster data 406. The characteristics of the cluster 160 may include one or more of total area of the cluster 160, one or more linear dimensions of the cluster 160, perimeter length of the cluster 160, shape of the cluster 160, symmetry of the cluster 160 with respect to one or more axes, and so forth. One such implementation utilizing a distance from a geometric center of the cluster 160 to a farthest point on the cluster is described with regard to FIG. 5.

In other implementations other techniques may be used. In one implementation a fill ratio of the local map 136 based on the differential map 140 may be used to determine a classification of anomaly such as {localization failure}. A local map fill ratio may be calculated as the total area of all clusters 160 within the corresponding area of the physical space 102 associated with the local map 136, divided by a total area of the local map 136. If the local map fill ratio exceeds a threshold value, an anomaly classified as a localization failure may be deemed to have occurred. In the event of a localization failure, the mitigation data 144 may direct the AMD 104 to perform actions to attempt to resolve the localization failure. For example, the AMD 104 may proceed to perform a loop closure process to attempt to correct the localization failure. In another example, the AMD 104 may attempt to move to another location from which additional information, such as external features in the physical space 102, are visible to the sensors 122. The sensors 122 may acquire additional sensor data 126 that is then used to localize the AMD 104 in the physical space 102.

In another implementation, a relative position and shape of the cluster 160 may be used to determine if an anomaly is present. For example, if the relative position of the cluster 160 is at a specified distance and direction from the AMD 104 and has a particular shape, such as elliptical, the cluster 160 may be classified as a sensor anomaly.

In another implementation, the shape of the cluster 160 may be used to determine if an anomaly is present. For example, a cluster 160 that has an aspect ratio greater than a threshold value may be classified as an anomaly. The aspect ratio may be calculated as width of the cluster 160 divided by length of the cluster 160. Continuing the example, a cluster 160 that is a single cell width and more than three cells long may be classified as a false obstacle.

The map analysis module 138 provides as output the map analysis data 142. In the implementation depicted, the map analysis data 142 may be based on one or more of the cluster data 406 or the cluster assessment data 410.

The map analysis data 142 may indicate that a map disagreement has been determined that exceeds a specified threshold. For example, the map analysis module 138 may disregard disagreements that have clusters 160 below a specified size or other dimensional limit. Continuing the example, disagreements associated with clusters 160 smaller than two differential cells 172 may be disregarded.

The map analysis data 142 may specify one or more of the size, shape, orientation, location, classification, or other information associated with a cluster 160. The map analysis data 142 may be provided to an action module 456.

The action module 456 may determine, based at least in part on the map analysis data 142, one or more mitigating actions may be performed. These mitigating actions may include updating information in the global map 134, operating the AMD 104 to move to a viewpoint or pose in the physical space 102 to observe at least a portion of the cluster 160 and acquire additional sensor data 126, performing a loop closure process for localization, moving to a known location to facilitate localization, permitting movement through the cluster 160, and so forth. For example, if the cluster assessment data 410 indicates a classification of {localization failure} the AMD 104 may attempt to move to a specified location in the physical space 102 from which a SLAM localization process may be performed.

In one implementation, the action module 456 may send mitigation data 458 to the mapping module 130 comprising or based on the map analysis data 142. For example, the mitigation data 458 may include information about the location and boundary of the cluster 160 and the classification of "actual obstacle". Based on this, the mapping module 130 may update the global map 134 to designate the corresponding area as containing an obstacle 110. In another example, the mitigation data 458 may direct the mapping module 130 to designate an area associated with a cluster 160 as "false obstacle", or to add to an anomaly map 430. The anomaly map 430 represents known anomalies that may appear as false obstacles. The anomaly map 430 may include additional information about the anomalies. For example, the anomaly map 430 may indicate a direction that is associated with the anomaly. Continuing the example, some anomalies may only be visible from a particular direction, and this direction may be specified in the anomaly map 430. The anomaly map 430 is discussed in more detail with regard to FIG. 6.

In another implementation the action module 456 may send mitigation data 458 to the autonomous navigation module 146 directing the AMD 104 to move to a viewpoint to acquire additional sensor data 126. The viewpoint may comprise a pose from which at least a portion of the cluster 160 would be within the sensor FOV 112. For example, the viewpoint may comprise another vantage point from which the AMD 104 is able to gather information about the cluster 160. Based on this additional sensor data 126, the anomaly may be resolved. For example, if the additional sensor data 126 indicates a disagreement persists and is representative of an obstacle 110, then the corresponding portion of the physical space 102 may be designated as an obstacle 110 in the global map 134.

With regard to this implementation, a viewpoint plan module 452 may be used to determine mitigation viewpoint data 454 indicative of one or more viewpoints. The viewpoint plan module 452 may be configured to determine viewpoints that are accessible by the AMD 104 using the available map data, would result in the area to be observed being within the sensor FOV 112, and are expected to provide a clear line of sight to the area being observed. In one implementation, the viewpoint plan module 452 may determine a viewpoint that is one or more of a minimum distance, or angular separation, and so forth from a first pose where first sensor data 126 was acquired that is associated with the disagreement. For example, the viewpoint plan module 452 may select a viewpoint that is at least 1 meter away from a pose where first sensor data 126 was acquired.

The viewpoint plan module 452 may select viewpoints based at least in part on other data, such as path plan data

248. For example, the viewpoint plan module 452 may determine mitigation viewpoint data 454 comprising a viewpoint that is closest to a path currently being used by the autonomous navigation module 146. Continuing the example, the viewpoint may be represented as a waypoint representative of a location in the physical space 102. The path plan data 248 may comprise a plurality of sequential waypoints that the AMD 104 intends to move through. Responsive to the mitigation data 458, the autonomous navigation module 146 may insert a waypoint corresponding to the viewpoint into the path plan data 248. In some implementations, a re-planning may occur, and second path plan data 248 may be generated that includes the viewpoint as a destination.

The action module 456 may utilize one or more comparisons to determine the mitigating actions to be performed. These comparisons may be based on one or more characteristics of the cluster 160, classification of the cluster 160, and so forth. For example, the map analysis data 142 indicates a small cluster 160 comprising two differential cells 172. These differential cells 172 are located along the proposed path specified by the path plan data 248. The action module 456 may determine mitigation data 458 that comprises instructions to avoid the portions of the physical space 102 that are associated with these differential cells 172. The mitigation data 458 may be provided to the autonomous navigation module 146 that subsequently avoids traversing those differential cells 172.

The map analysis module 138 may maintain an anomaly map 430 that is representative of portions of the physical space 102 that have been previously determined to be associated with clusters 160. In some implementations the anomaly map 430 may be limited to clusters 160 designated as "false obstacle". In this implementation, the anomaly map 430 may be representative of the portions of the physical space 102 that are associated with sensor anomalies, such as reflections, optical illusions, and so forth that may result in a detection of a false obstacle when none is present.

The anomaly map 430 may be used by the map analysis module 138. For example, if a cluster 160 indicative of a disagreement is deemed to correspond to a previously known anomaly indicated by the anomaly map, the cluster 160 may be deemed to be a false obstacle. In another example, the map analysis module 138 may add information to the anomaly map 430.

The anomaly map 430 may be utilized by the autonomous navigation module 146 during operation. In situations in which the anomaly map 430 indicates a particular area is classified as being a false obstacle, the autonomous navigation module 146 may include that area as being traversable for the purposes of path planning. For example, the path plan data 248 may include one or more waypoints that are within the area classified as being a false obstacle.

In other implementations, the autonomous navigation module 146 may use the anomaly map 430 to avoid anomalous areas. For example, the autonomous navigation module 146 may determine path plan data 248 indicating a route from the current location 106 to the destination location 108 that avoids traversing any anomalous areas indicated by the anomaly map 430.

In some implementations, the AMD 104 may move through an anomalous area specified by the anomaly map 430 even if the local map 136 indicates an obstacle. During traversal of a portion of the physical space 102 that is designated by the anomaly map 430 as containing an anomaly such as a false obstacle, the AMD 104 may operate at a reduced speed. For example, the AMD 104 may move more slowly through an area in which false obstacles have been previously detected.

In some implementations information associated with the anomaly map 430 may be expressed as a cost map. For example, areas or cells in the global map 134 that are associated with anomalies may have a cost value that is greater than that of empty cells, and less than that of cells containing obstacles. During path planning, the autonomous navigation module 146 may determine a path plan that minimizes overall cost, avoiding the cells associated with anomalies, but passing through those areas associated with anomalies as needed to complete the path.

The autonomous navigation module 146 may also use the anomaly map 430 or previously determined map analysis data 142 to opportunistically select viewpoints while moving through the physical space 102. For example, while performing a sentry function in which the AMD 104 moves through the physical space 102, the viewpoint plan module 452 may be used to determine mitigation viewpoint data 454 to acquire sensor data 126 about at least some of the anomalous areas.

Figure 5:
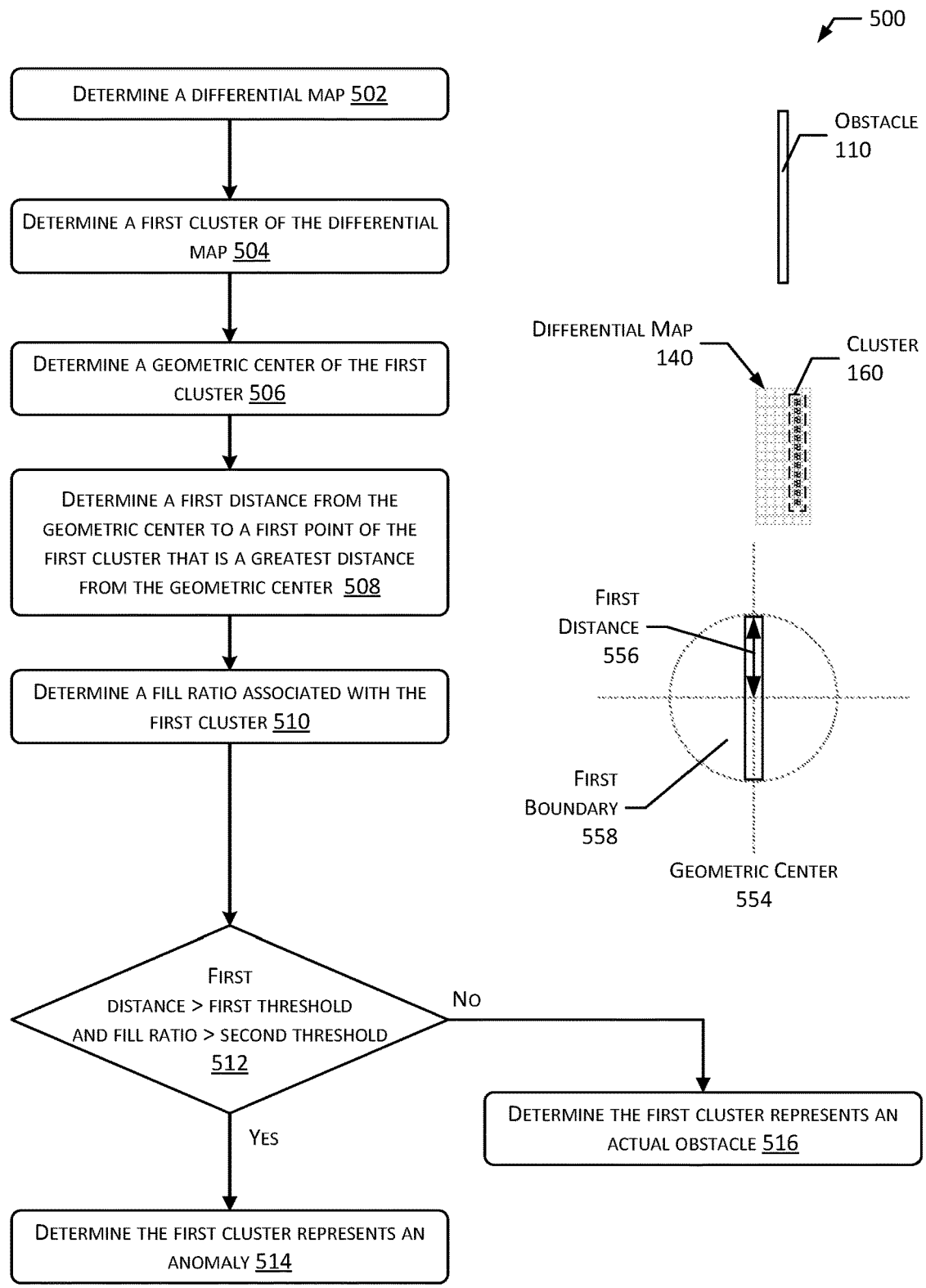
FIG. 5 is a flow diagram of a process for assessing a differential map to determine if an obstacle is an actual obstacle or an anomaly, according to some implementations.

FIG. 5 is a flow diagram 500 of a process for assessing a differential map 140 to determine cluster assessment data 410, according to some implementations. For example, the cluster assessment data 410 may specify a classification as to whether a cluster 160 in the differential map 140 is an actual obstacle 110 or an anomaly such as a false obstacle. The process may be executed by one or more of the AMD 104, the docking station 192, the servers 194, or other devices 196.

At 502 a differential map 140 is determined. For example, the differential module 402 may accept as input the global map 134 and the local map 136 to determine the differential map 140.

At 504 a first cluster 160 having a first boundary 558 is determined. For example, the first boundary 558 may comprise an outermost or distal portion of cells or cubes that form a perimeter or exterior surface of the first cluster 160.

At 506 a geometric center 554 of the first cluster 160 is determined. For example, the geometric center 554 may comprise a centroid of the area of a two-dimensional cluster 160 or a centroid of the volume encompassed by a three-dimensional cluster 160.

At 508 a first distance 556 is determined from a point of the first cluster 160 that is a greatest, or farthest distance from the geometric center 554. For example, the point may comprise a point on the first boundary 558 that is a greatest distance from the geometric center 554.

At 510 a fill ratio associated with the first cluster 160 is determined. The fill ratio may be based on a first area representative of the area of the first cluster 160 and a second area determined based on the first distance. In one implementation, the second area may comprise a circle having a radius equal to the first distance 556. In this implementation, the fill ratio may comprise the total area of the first cluster 160 divided by a total area of a circle having a radius of the first distance 556. This may be calculated using EQUATION 1:

$$\rho = \frac{n_c s_c^2}{\prod r^2} \quad \text{Equation 1}$$

where rho is the fill ratio, nc is a number (count) of cells in the cluster 160, sc is an area of an individual cell, and r is the first distance 556.

Equation 1

In another implementation a first volume of the cluster 160 may be determined, a second volume may be determined, and a fill ratio may be determined based on these volumes.

As mentioned above, the second area may be determined based on the first distance 556. For example, the second area may comprise a circle centered at the geometric center 554 and having a radius of the first distance 556. In other implementations other shapes may be used. For example, the second area may comprise a square centered at the geometric center 554 and having a length of a side that is twice the first distance 556.

At 512 a comparison is made to determine if the first distance 556 is greater than a first threshold and if the fill ratio is greater than a second threshold. For example, the first distance 556 may be specified in meters, and the first threshold may specify a value of 0.15 meters. In another example, the fill ratio may be calculated as a dimensionless value, such as "0.37". The second threshold may also be a dimensionless value, such as "0.25". If both conditions are true, the process proceeds to 514. If not, the process proceeds to 516. In other implementations, the comparison may utilize specified ranges. For example, if the first distance 556 is within a first threshold range and the fill ratio is within a second threshold range, the process may proceed to 514.

In some implementations the threshold values may be determined experimentally. For example, samples of experimental data including classification data may be processed to determine one or more of the first threshold or the second threshold.

The threshold values may vary based on one or more parameters. These parameters may include one or more of a distance between the AMD 104 and a portion of the first cluster 160, an angle between a center of the sensor FOV 112 and a portion of the first cluster 160, a maximum height of the first cluster 160, sensor accuracy, and so forth.

The threshold values may be retrieved from a previously stored data structure, such as a lookup table. For example, based on a given distance between the AMD 104 and the geometric center 554, a first value of the second threshold may be retrieved from a first lookup table. In another example, based on a relative angle between a center of the FOV 112 and the geometric center 554 a second value of the second threshold may be retrieved from a second lookup table. In yet another example, based on the distance between the AMD 104 and the geometric center 554 and the relative angle between the center of the FOV 112 and the geometric center 554, a third value of the second threshold may be retrieved from a third lookup table.

The one or more parameters may include a height of the first cluster 160. For example, one of the parameters may be a maximum observed height of the first cluster 160. By determining a value of the first threshold based on the maximum observed height of the first cluster 160, the system 100 may provide improved accuracy in properly classifying a false obstacle. For example, a false obstacle may exhibit a particular height resulting from sensor 122 placement.

In some implementations, the threshold values may be calculated based on the one or more parameters. For example, a fourth value of the second threshold may be calculated based on a fixed value, the distance between the AMD 104 and the geometric center 554, and the relative angle between the center of the FOV 112 and the geometric center 554.

At 514 the first cluster 160 is determined to be associated with a classification of anomaly, such as representing a false obstacle. For example, first cluster assessment data 410(1) may indicate a classification of {false obstacle}.

At 516 the first cluster 160 is determined to be associated with a classification of an actual obstacle 110. For example, first cluster assessment data 410(1) may indicate a classification of {obstacle}.

In some implementations the cluster assessment data 410 may include the first distance 556, the fill ratio, or information based on the fill ratio. For example, the cluster assessment data 410 may comprise "{classification_value}, {distance}, {fill_ratio_value}".

Figure 6:
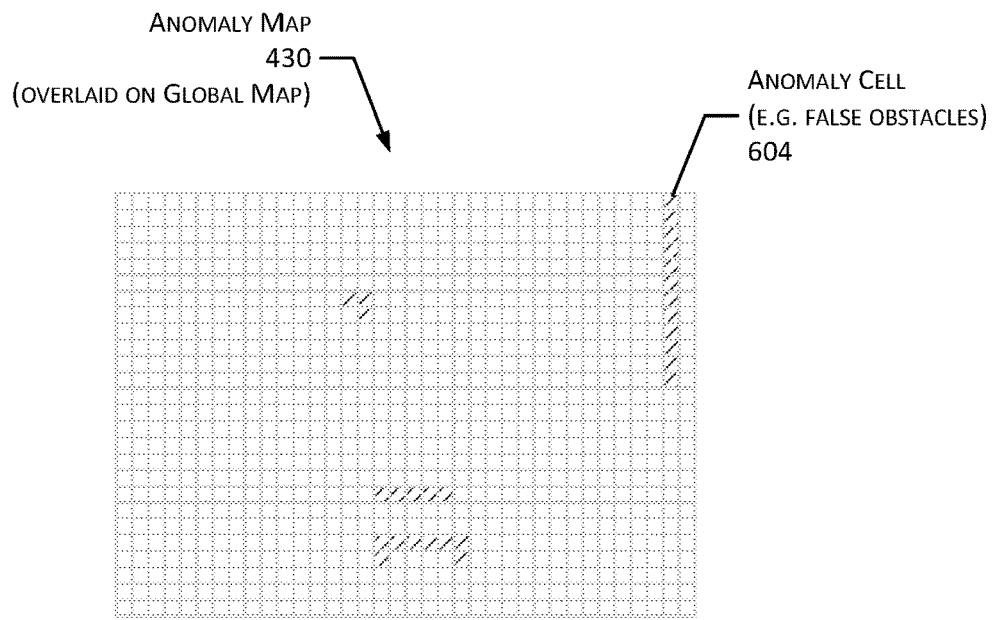
FIG. 6 illustrates an anomaly map that specifies the locations of anomalies in the physical space, according to some implementations.
Figure 6:
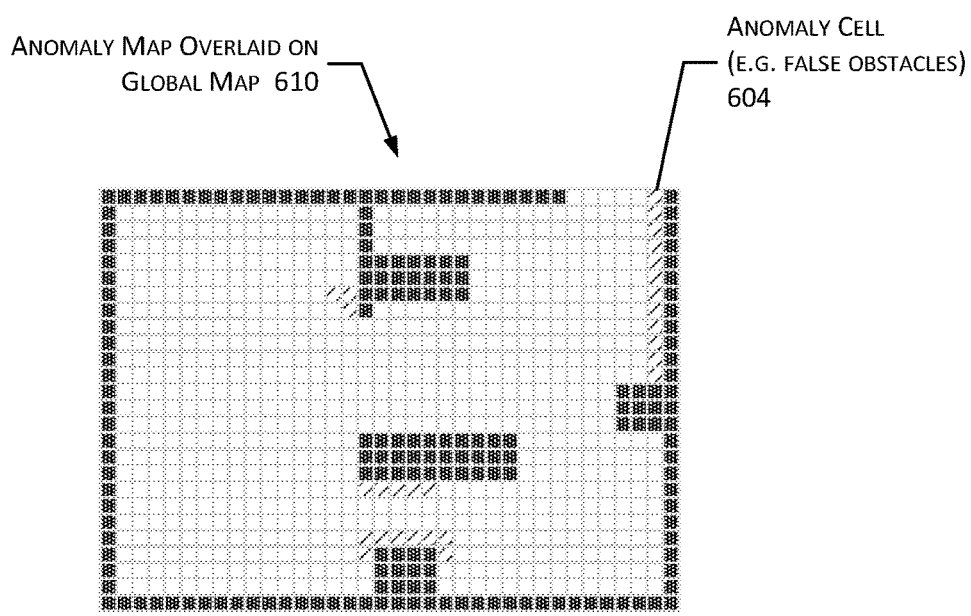

FIG. 6 illustrates at 600 an anomaly map 430 that specifies the locations of anomalies in the physical space 102, according to some implementations. Depicted is the anomaly map 430 which may include one or more known anomaly cells 604. The known anomaly cells 604 represent particular portions of the physical space 102 that have been previously determined to be associated with anomalies, such as false obstacles.

In some implementations the anomaly map 604 may include additional information (not shown). For example, a known anomaly cell 604 or cluster of cells may be associated with classification data indicative of a classification such as {false obstacle}, {unknown}, and so forth. This additional information may be used by other modules, such as the autonomous navigation module 146.

The anomaly map 430 is also depicted at 610 overlaying the global map 134. In some implementations, the autonomous navigation module 146 may use the anomaly map 430 and the global map 134 to determine path plan data 248 indicative of a path between a first location in the physical space 102 and a second location in the physical space 102. In implementations where additional information about the known anomaly cell 604 is available, the autonomous navigation module 146 may take this into consideration. For example, known anomaly cells 604 with a classification of {false obstacle} may be deemed to be traversable, while known anomaly cells 604 with a classification of {unknown} may be avoided.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EE-PROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

In other implementations, other types of autonomous mobile devices (AMDs) may use the systems and techniques described herein. For example, the AMD 104 may comprise an autonomous ground vehicle that is moving on a street, an autonomous aerial vehicle in the air, autonomous marine vehicle, and so forth.

What is claimed is:

1. An autonomous mobile device (AMD) located in a physical space, the AMD comprising:
   one or more sensors;
   one or more memories storing computer-executable instructions; and
   one or more processors to execute the computer-executable instructions to:
      retrieve a global map indicative of a first set of one or more obstacles and their respective locations within the physical space;
      determine, using the one or more sensors, a local map indicative of a second set of one or more obstacles within a first portion of the physical space;
      determine, based on the global map and the local map, a differential map wherein the differential map is representative of a third set of one or more obstacles that are one of:
         represented in the global map and not in the local map, or
         represented in the local map and not in the global map;
      determine, based on the differential map, a first cluster representative of a first area within the physical space that includes at least a portion of the third set of the one or more obstacles;
      determine one or more characteristics of the first cluster, wherein the one or more characteristics comprise:
         a first distance extending from a geometric center of the first cluster to a farthest point of the first cluster, and
         a first fill ratio based on (i) a portion of the first area that is deemed occupied by an obstacle and (ii) a second area of a circle with a radius of the first distance:
      compare the first distance to a first threshold;
      compare the first fill ratio to a second threshold;
      determine, based on the comparison of the first distance to the first threshold and the comparison of the first fill ratio to the second threshold, that the first cluster represents an obstacle or an anomaly;
      determine a first action associated with the first cluster; wherein the first action causes the AMD to move within the physical space and
      perform the first action.

2. The AMD of claim 1, wherein the one or more characteristics further comprise one or more of:
   a total area of the first cluster;
   an aspect ratio of the first cluster; or
   a second fill ratio based on (i) the portion of the first area that is deemed occupied by the obstacle and (ii) a third area of the local map.

3. The AMD of claim 1, wherein the one or more processors further execute the computer-executable instructions to:
   determine that the first distance is greater than the first threshold;
   determine that the first fill ratio is greater than the second threshold; and
   determine that the first cluster represents the anomaly.

4. The AMD of claim 1, wherein the one or more processors further execute the computer-executable instructions to:
   determine a first viewpoint indicative of a pose of the AMD within the physical space, wherein, at the first viewpoint, the first area is within a field of view of the one or more sensors;
   wherein the first action is indicative of:
      moving the AMD to the first viewpoint,
      acquiring, using the one or more sensors, sensor data associated with the first area, and
      determining, based on the sensor data, one or more of the local map or the global map.

5. The AMD of claim 1, wherein the one or more processors further execute the computer-executable instructions to:
   determine that the first cluster represents the anomaly; and
   cause the AMD to traverse through the first area.

6. The AMD of claim 1, wherein the one or more processors further execute the computer-executable instructions to:
   determine that the first cluster represents the anomaly; and
   store an anomaly map indicative of a location of the first area within the physical space.

7. The AMD of claim 6, wherein the one or more processors further execute the computer-executable instructions to:
   determine a path from a first location in the physical space to a second location in the physical space based on the global map and the anomaly map.

8. A method comprising:
retrieving a global map indicative of a first set of one or more obstacles and their respective locations within a physical space;
determining, using one or more sensors, a local map indicative of a second set of one or more obstacles within a first portion of the physical space;
determining, based on the global map and the local map, a differential map wherein the differential map is representative of a third set of one or more obstacles that are one of:
represented in the global map and not in the local map, or
represented in the local map and not in the global map;
determining, based on the differential map, a first cluster representative of a first area within the physical space that includes at least a portion of the third set of one or more obstacles;
determining one or more characteristics of the first cluster, wherein the one or more characteristics comprise:
a first distance extending from a geometric center of the first cluster to a farthest point of the first cluster, and
a fill ratio based on (i) a portion of the first area that is deemed occupied by an obstacle and (ii) a second area of a circle with a radius of the first distance;
determining, based on the one or more characteristics of the first cluster, first data associated with the third set of one or more obstacles; and moving an autonomous mobile device (AMD) based on the first data.

9. The method of claim 8, wherein the first data indicates that each obstacle of the third set of one or more obstacles is an obstacle or an anomaly; and
wherein the AMD moves such that:
if the first data indicates an obstacle, a third area in the physical space that is associated with the third set of one or more obstacles is avoided, or
if the first data indicates an anomaly, at least a portion of the third area is traversed by the AMD.

10. The method of claim 8, further comprising:
determining a first viewpoint indicative of a pose of the AMD within the physical space, wherein, at the first viewpoint, at least a portion of the first area associated with the third set of one or more obstacles is within a field of view of one or more sensors of the AMD;
moving the AMD to the first viewpoint;
acquiring, using the one or more sensors of the AMD, sensor data of the at least a portion of the first area; and
determining an update to the global map based on the sensor data.

11. The method of claim 8, further comprising:
determining that the first distance is greater than a first threshold value;
determining that the fill ratio is greater than a second threshold value; and
wherein the first data indicates the first cluster represents an anomaly.

12. The method of claim 8, further comprising:
determining, based on the first data and the differential map, an anomaly map indicative of a previously observed false obstacle associated with a particular location in the physical space;
determining a path from a first location in the physical space to a second location in the physical space based on the global map and the anomaly map; and
wherein the moving the AMD is further based on the path.

13. A system comprising:
an autonomous mobile device (AMD) located in a physical space, the AMD comprising one or more sensors;
one or more memories storing computer-executable instructions; and
one or more processors to execute the computer-executable instructions to:
retrieve a global map indicative of a first set of one or more obstacles and their respective locations within the physical space;
determine, using the one or more sensors, a local map indicative of a second set of one or more obstacles within a first portion of the physical space;
determine, based on the global map and the local map, a differential map wherein the differential map is representative of a third set of one or more obstacles that are one of:
represented in the global map and not in the local map, or
represented in the local map and not in the global map; and
determine one or more characteristics of a first cluster, wherein the one or more characteristics comprise:
a first distance extending from a geometric center of the first cluster to a farthest point of the first cluster, and
a fill ratio based on (i) a portion of a first area that is deemed occupied by an obstacle and (ii) a second area of a circle with a radius of the first distance;
determine, based on the one or more characteristics, first data associated with the third set of one or more obstacles and move the AMD based on the first data.

14. The system of claim 13, wherein the first data indicates that the third set of one or more obstacles is an obstacle; and
wherein the one or more processors further execute the computer-executable instructions to:
determine a path comprising a plurality of waypoints, wherein no waypoints are within a third area associated with the third set of one or more obstacles; and
wherein the movement of
move the AMD is further based on the path.

15. The system of claim 13, wherein the first data indicates that the third set of one or more obstacles is an anomaly; and
wherein the one or more processors further execute the computer-executable instructions to:
determine a path comprising a plurality of waypoints, wherein one or more waypoints are within a third area associated with the third set of one or more obstacles; and wherein the movement of
move the AMD is further based on the path.

16. The system of claim 13, wherein the one or more processors further execute the computer-executable instructions to:
determine the first cluster representative of a third area within the physical space that includes at least a portion of the third set of one or more obstacles.

17. The system of claim 13, wherein the one or more processors further execute the computer-executable instructions to:
determine the first cluster representative of a third area within the physical space that includes at least a portion of the third set of one or more obstacles;
determine that the first distance is greater than a first threshold value;
determine that the fill ratio is greater than a second threshold value; and wherein the first data indicates that the first cluster represents an anomaly.

18. The system of claim 13, wherein the one or more processors further execute the computer-executable instructions to:
   determine a first viewpoint indicative of a pose of the AMD within the physical space, wherein a third area within the physical space that includes the third set of one or more obstacles is within a field of view of the one or more sensors;
   move the AMD to the first viewpoint;
   acquire sensor data associated with the third area; and
   determine, based on the sensor data, one or more of the local map or the global map.

19. The system of claim 13, wherein the one or more processors further execute the computer-executable instructions to:
   determine, based on the first data and the differential map, an anomaly map indicative of a previously observed false obstacle associated with a particular location in the physical space;
   determine a path from a first location in the physical space to a second location in the physical space based on the global map and the anomaly map; and wherein the movement
   move the AMD is further based on the path.

20. The system of claim 13, wherein the one or more characteristics further comprise one or more of:
   a total area of the first cluster;
   an aspect ratio of the first cluster; or
   a second fill ratio based on (i) the portion of the first area that is deemed occupied by the obstacle and (ii) a third area of the local map.

* * * * *

UNITED STATES PATENT AND TRADEMARK OFFICE
CERTIFICATE OF CORRECTION

| | | |
|---|---|---|
| PATENT NO. | : 12,422,276 B1 | Page 1 of 1 |
| APPLICATION NO. | : 18/055954 | |
| DATED | : September 23, 2025 | |
| INVENTOR(S) | : Nathalie Majcherczyk et al. | |

It is certified that error appears in the above-identified patent and that said Letters Patent is hereby corrected as shown below:

On the Title Page

Please add U.S. Patent Pub No. 2021/0274440 ("Yamanaka")

In the Claims

Column 32, Claim 13, Line 31:
Currently reads: "obstacles and move the AMD based on the first data."
Where it should read: --obstacles; and
move the AMD based on the first data.--

Column 32, Claim 14, Lines 40-41:
Currently read: "wherein the movement of move the AMD is further based on the path."
Where they should read: --wherein the movement of the AMD is further based on the path.--

Column 32, Claim 15, Lines 50-51:
Currently read: "wherein the movement of move the AMD is further based on the path."
Where they should read: --wherein the movement of the AMD is further based on the path.--

Column 34, Claim 19, Lines 8-9:
Currently read: "movement move the AMD is further based on the path."
Where they should read: --movement of the AMD is further based on the path.--

Signed and Sealed this
Twenty-eighth Day of October, 2025

John A. Squires
*Director of the United States Patent and Trademark Office*